(12) United States Patent
Yoshizawa et al.

(10) Patent No.: US 6,371,166 B1
(45) Date of Patent: Apr. 16, 2002

(54) SOLENOID VALVE DEVICE

(75) Inventors: Hiroshi Yoshizawa; Katsumi Shirai; Akira Nagasaki; Shigeto Ryuen; Masayuki Shibata, all of Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/725,446

(22) Filed: Nov. 30, 2000

(51) Int. Cl.⁷ .............................................. F16K 11/24
(52) U.S. Cl. ..................................................... 137/884
(58) Field of Search ........................................ 137/884

(56) References Cited

U.S. PATENT DOCUMENTS

| | | | | |
|---|---|---|---|---|
| 5,127,440 A | * | 7/1992 | Maas t al. | 137/884 |
| 5,152,322 A | * | 10/1992 | Maas et al. | 137/884 |
| 5,449,226 A | * | 9/1995 | Fujita et al. | 303/116.4 |
| 5,474,108 A | * | 12/1995 | Inden et al. | 137/884 |
| 5,597,015 A | * | 1/1997 | Asou et al. | 137/625.64 |
| 5,692,813 A | * | 12/1997 | Vellmer | 303/119.2 |
| 5,823,071 A | * | 10/1998 | Petrosky et al. | 74/606 R |
| 5,845,672 A | * | 12/1998 | Reuter et al. | 1/129.15 |
| 5,887,624 A | * | 3/1999 | Taniguchi et al. | 137/884 |

FOREIGN PATENT DOCUMENTS

JP 2565526 10/1998

* cited by examiner

*Primary Examiner*—John Fox
(74) *Attorney, Agent, or Firm*—Arent Fox Kinter Plotkin & Kahn, PLLC

(57) ABSTRACT

In a solenoid valve device in which connection terminals, each of which is connected to one of a plurality of solenoid valves fixed in a mounting block, are placed inside a common coupler, a coupler assembly integrally comprising the coupler is detachably mounted on the mounting block at a position which is spaced back from each of the solenoid parts, and elastic connecting members made from an electrically conductive metal are provided between each of a plurality of first flat terminals which are fixedly positioned on the side of the coupler assembly facing the mounting block so as to connect to the corresponding electrically conductive lead members arranged in the coupler assembly and second flat terminals, each of which is arranged at the rear end of each of the solenoid parts so as to be individually opposite the first flat terminals. The solenoid part of each of the solenoid valves and the respective connection terminals inside the coupler can thus be connected and disconnected extremely easily and, moreover, any erroneous connection can be avoided.

5 Claims, 10 Drawing Sheets

SOLENOID VALVE DEVICE

BACKGROUND OF THE INVENTION

1. Field of the Invention

The present invention relates to a solenoid valve device in which a plurality of solenoid valves each comprising a valve part whose tip end is fitted in a fixed mounting block and a solenoid part whose tip end is continuously provided at the rear end of the valve part are fixed to the mounting block, and connection terminals, each of which is connected to the solenoid part of the respective solenoid valves, are placed inside a common coupler.

2. Description of the Prior Art

Such a solenoid valve device is known in the art in, for example, Japanese Patent Application Laid-open No. 63-180550, in which a coupler is integrally formed with a synthetic resin cover which is mounted on a mounting block so as to cover each of the solenoid valves, a plurality of connection terminals, parts of which are buried in the cover, are placed inside the coupler and each of the connection terminals is connected to the solenoid part of the respective solenoid valves via a lead wire.

However, in the above-mentioned solenoid valve device of the art, when the solenoid valve device is assembled it is necessary to connect each of the lead wires by means of soldering, etc., the assembly performance is poor and the number of assembly steps increases, and there is a possibility that erroneous connection of the lead wires might occur. Moreover, since the cover is applied to the solenoid valves subsequent to the connection via the lead wires, the lead wires need to have a length longer than that required for the connection, it is necessary to carefully attach the cover to the mounting block so that the extra length of the lead wires is not trapped between the cover and the mounting block, and thus the assembly operation becomes complicated. Furthermore, it is necessary to undo the connection of the lead wires during maintenance such as that involving replacement of the solenoid valves, and thus the maintenance operation also becomes complicated.

SUMMARY OF THE INVENTION

The present invention has been carried out in view of the above-mentioned circumstances, and it is an object of the present invention to provide a solenoid valve device in which a solenoid part of each of solenoid valves and each of connection terminals inside a coupler can be connected and disconnected extremely easily and, moreover, no erroneous connection can occur.

In order to achieve the above-mentioned object, according to a first aspect and feature of the present invention, a solenoid valve device is provided in which a plurality of solenoid valves each comprising a valve part whose tip end is fitted in a fixed mounting block and a solenoid part whose tip end is provided continuously at a rear end of the valve part are fixed to the mounting block, and connection terminals, each of which is connected to the solenoid part of the respective solenoid valves, are placed inside a common coupler, wherein a coupler assembly integrally provided with the coupler is detachably mounted on the mounting block at a position which is spaced back from each of the solenoid parts, a plurality of electrically conductive lead members, each of which has one end connected to the connection terminals respectively, are arranged in the coupler assembly, and elastic connecting members made from an electrically conductive metal are respectively interposed between a plurality of first flat terminals, each of which is connected to the other end of the corresponding lead member and fixedly positioned on the side of the coupler assembly facing the mounting block, and second flat terminals which are arranged at the rear ends of the respective solenoid parts so as to be individually opposite the first flat terminals.

In accordance with the above-mentioned arrangement of the first feature, each of the connection terminals inside the coupler can be individually connected to the solenoid part of the respective solenoid valves simply by mounting the coupler assembly on the mounting block so as to provide an elastic connecting member between the respective first and second flat terminals, there is no need to connect the lead wires during assembly, and when carrying out maintenance such as replacement of each of the solenoid valves the coupler assembly may be demounted from the mounting block and there is no need to disconnect the lead wires. Therefore, it is possible to enhance the operational efficiency by carrying out the connection and disconnection between the solenoid part of each of the solenoid valves and the corresponding connection terminals inside the coupler with great ease so simplifying the assembly and maintenance operations. Moreover, there is no possibility of erroneous connection of the lead wires and there is no need to take care over trapping of the lead wires. Furthermore, the elastic connecting members can absorb a displacement of the relative positions of the mounting block and the coupler assembly and form a reliable electrical connection between the first and second flat terminals, it is unnecessary to enhance the assembly accuracy with which the coupler assembly is mounted on the mounting block, and the coupler assembly can be easily mounted on the mounting block.

Furthermore, in addition to the above-mentioned first feature, according to the second aspect and feature of the present invention, the coupler assembly is comprised of a first body made from a synthetic resin integrally provided with the coupler and a second body made from a synthetic resin which is mounted on the first body such that they overlap each other, wherein said lead members which each have one end connected to a plurality of said connection terminals respectively which are fixedly positioned inside the coupler, and the first flat terminals, each of which is connected to the other end of the lead members respectively, are arranged on the side of the first body facing the second body, and wherein insertion holes into each of which a part of each of the elastic connecting members is inserted are provided on the second body so as to correspond to the first flat terminals respectively.

In accordance with the above-mentioned arrangement of the second feature, the lead members are contained between the first and second bodies, it is thus possible to protect the lead members while rendering them electrically insulating, and by inserting part of the elastic connecting members into the insertion holes one end of the elastic connecting members can easily be guided to the first flat terminals.

Furthermore, in addition to the above-mentioned second feature, according to the third aspect and feature of the present invention, a plurality of recessed parts which house the first flat terminals respectively are provided on the side of the first body facing the second body, and a plurality of fitting projections, each of which is made in the form of a tube so as to form a part of each of said insertion holes, are projectingly provided on the second body so as to be capable of fitting in each of the recessed parts respectively and, in accordance with the above-mentioned arrangement, the relative position of the first and second bodies can reliably and easily be adjusted and the accuracy with which the elastic connecting members are guided by the insertion holes can be enhanced as a result of an increase in the length of the insertion holes by a length corresponding to that of the fitting projections.

Furthermore, in addition to the above-mentioned second or third feature, according to the fourth aspect and feature of the present invention, each of the insertion holes is made in the form of a tapered hole whose diameter increases as it goes towards the first body and each of the elastic connecting members is a conical coil spring whose larger diameter end is positioned on the side of the first body. With the above-mentioned arrangement, since the elastic connecting members do not drop from the insertion holes, no special arrangement to retain the elastic connecting members in the coupler assembly is necessary, and moreover the accuracy of positioning the elastic connecting members inside the insertion holes can be enhanced.

Furthermore, in addition to the above-mentioned second or third feature, according to the fifth aspect and feature of the present invention, a plurality of hooks which elastically engage with one of the first and second bodies are integrally provided on the other of the first and second bodies. With the above-mentioned arrangement, no special member such as a screw part for mounting the second body on the first body is necessary, and the second body can easily be mounted on the first body by means of a small number of parts.

The above-mentioned and other objects, features and advantages of the present invention will become apparent from an explanation of preferable embodiments which will be described in detail below by reference to the attached drawings.

BRIEF DESCRIPTION OF THE DRAWINGS

FIG. 1 is a vertical cross-sectional front view of a solenoid valve device taken along a line 1—1 in FIG. 3.

FIG. 2 is a side view of a coupler assembly.

FIG. 3 is a plan view from an arrow 3 in FIG. 2.

FIG. 4 is a bottom view from an arrow 4 in FIG. 2.

FIG. 5 is a cross-sectional view taken along a line 5—5 in FIG. 3.

FIG. 6 is a cross-sectional view taken along a line 6—6 in FIG. 3.

FIG. 7 is a cross-sectional view taken along a line 7—7 in FIG. 3.

FIG. 8 is a bottom view of a first body.

FIG. 9 is a side view of a lead member.

FIG. 10 is a view from an arrow 10 in FIG. 9.

FIG. 11 is a view from an arrow 11 in FIG. 9.

DESCRIPTION OF PREFERRED EMBODIMENTS

Figure 1:
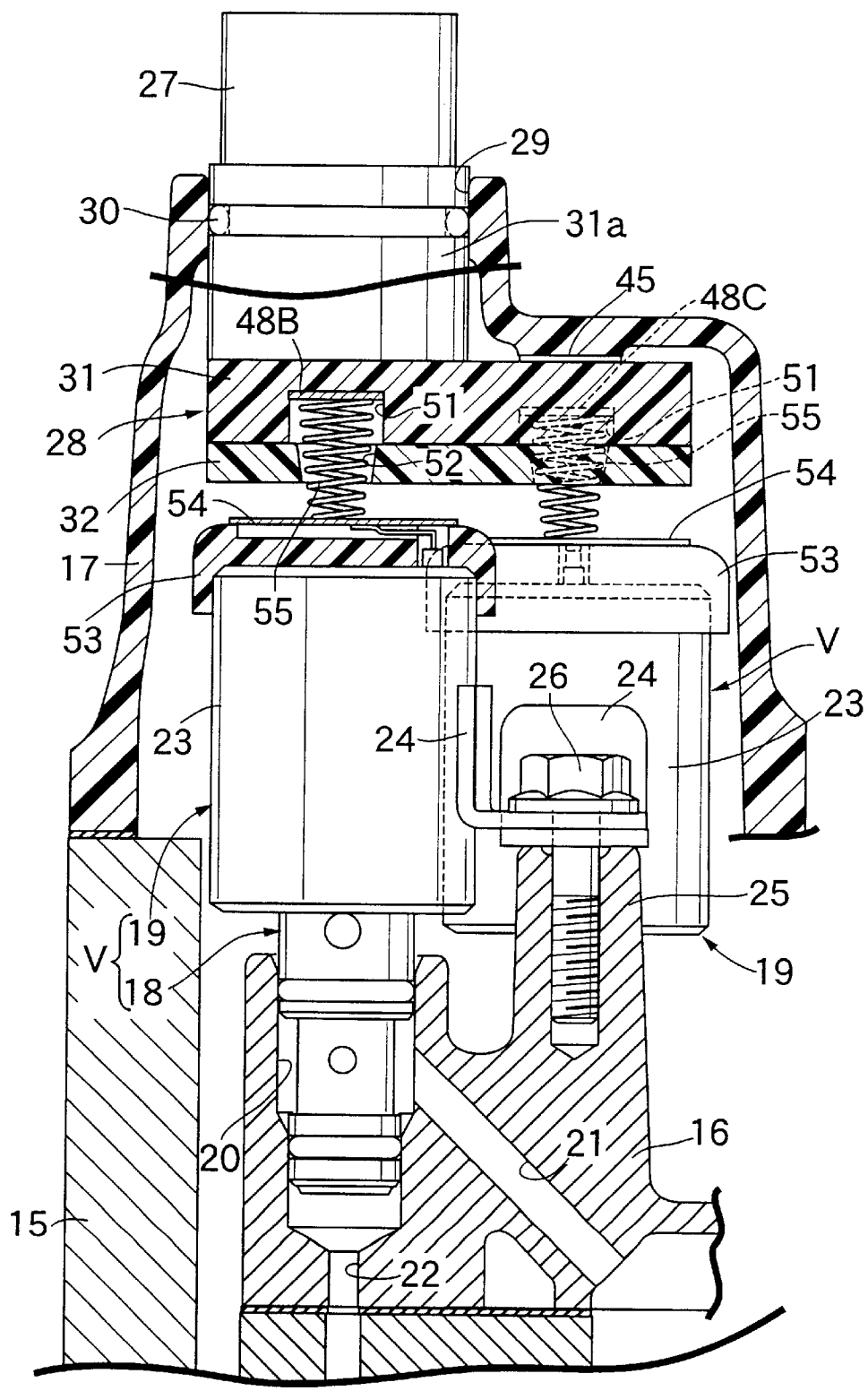
FIG. 1 to FIG. 11 illustrate a first embodiment of the present invention.
Figure 2:
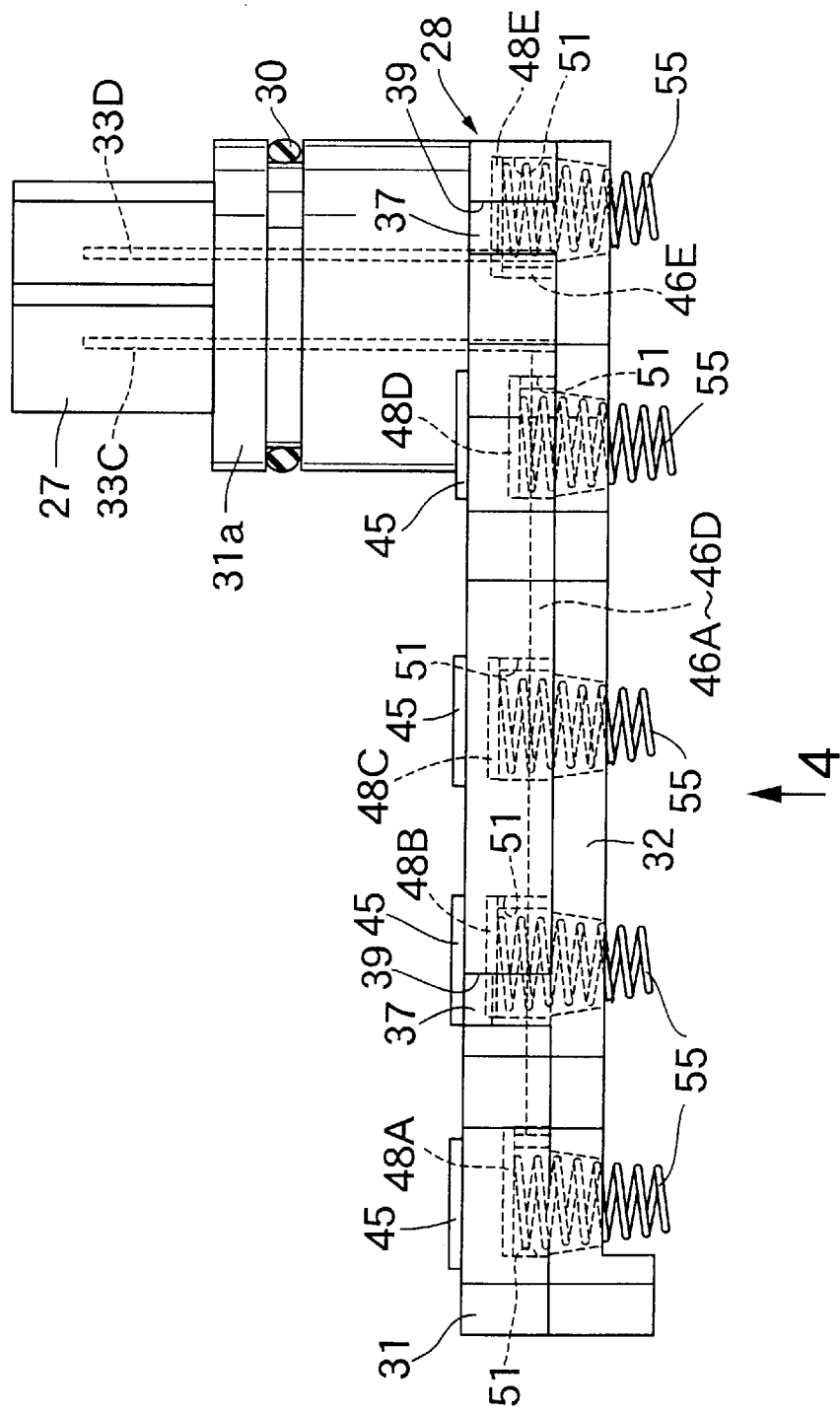
Figure 3:
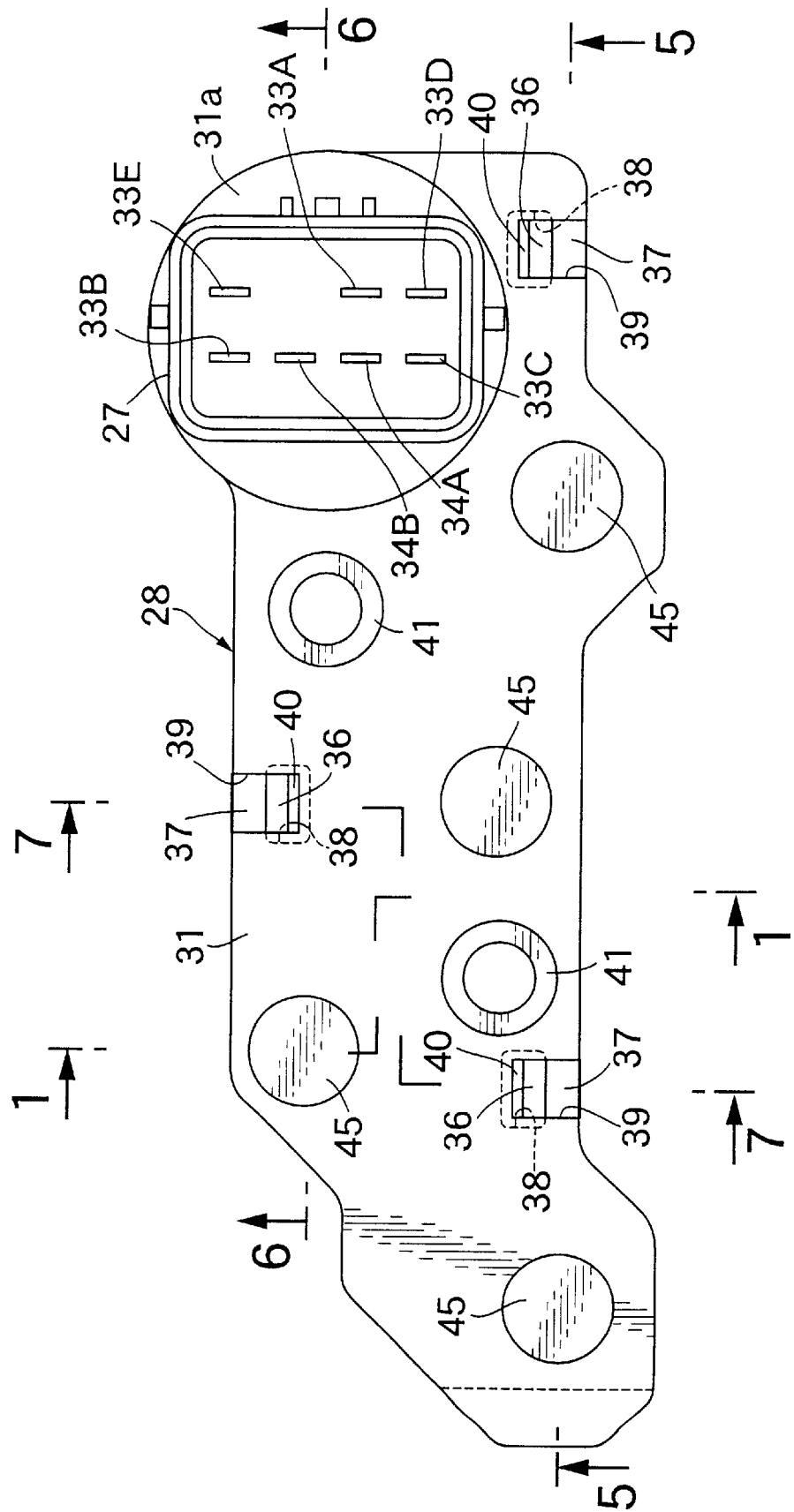
Figure 4:
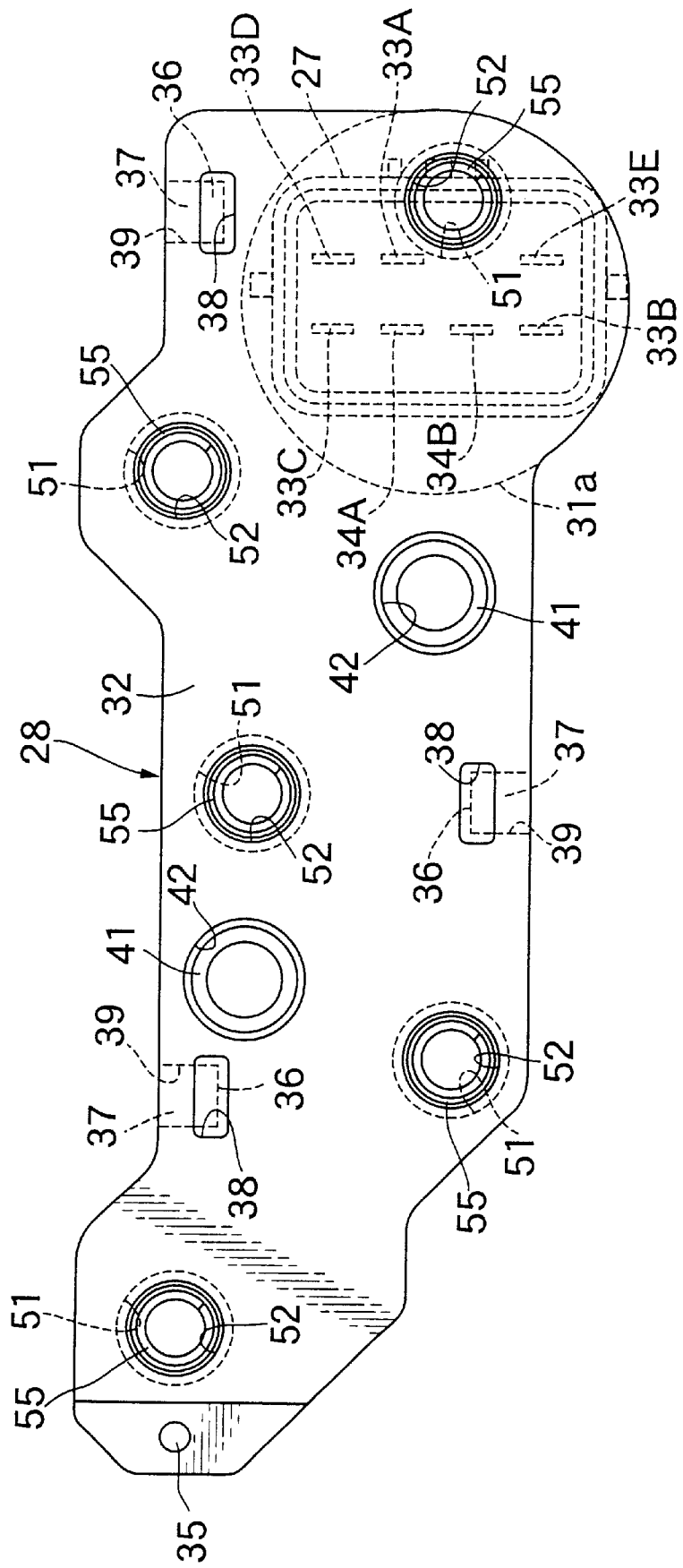
Figure 5:
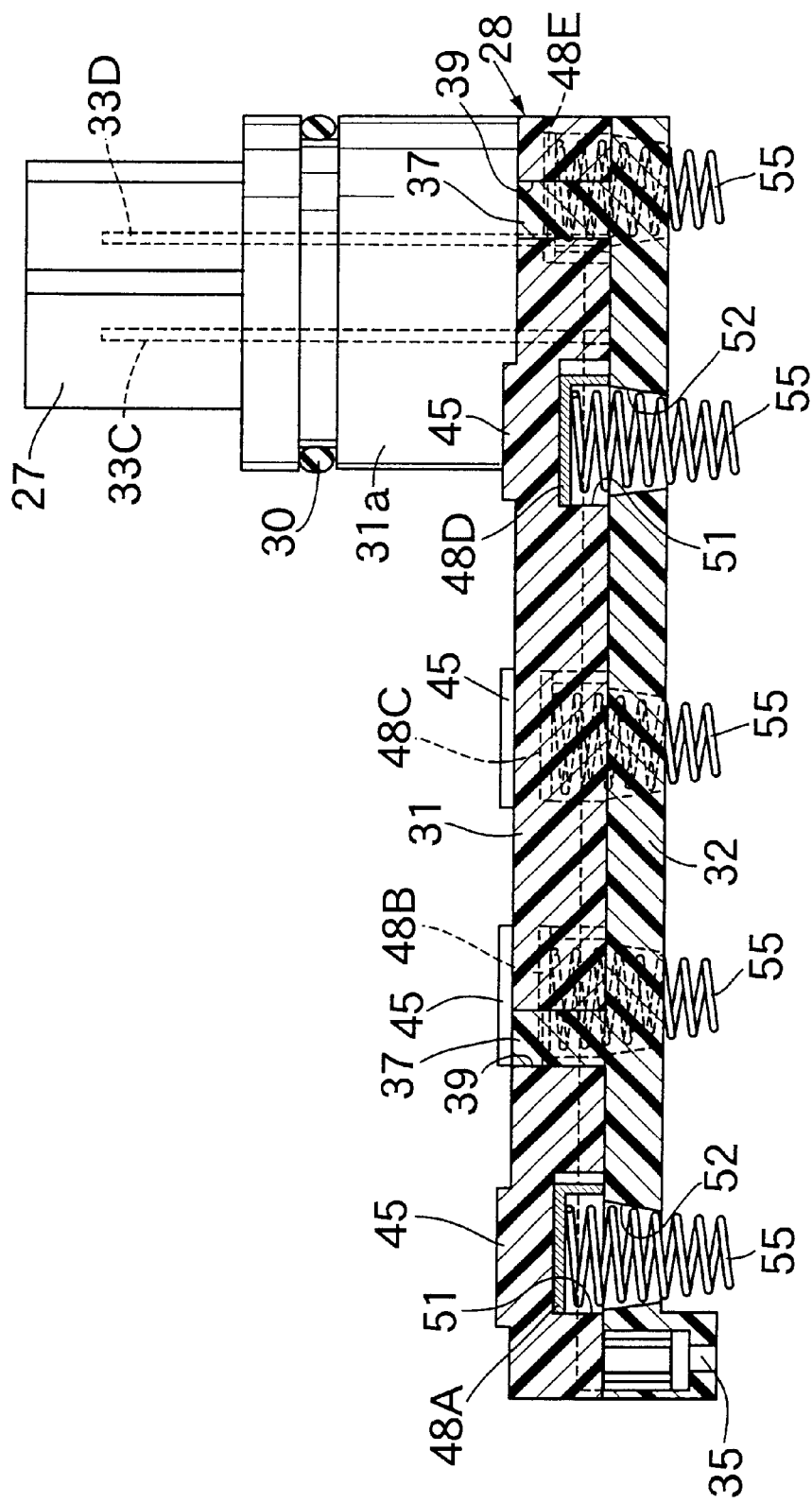

The first embodiment of the present invention is explained by reference to FIG. 1 to FIG. 11. In FIG. 1 this solenoid valve device is used, for example, for an automatic transmission for an automobile, in which, for example, five solenoid valves V, V · · · are placed on a mounting block 16 made from an electrically conductive metal which is placed inside a transmission case 15 in a fixed manner, and a synthetic resin cover 17 for covering these solenoid valves V, V · · · is mounted on the transmission case 15.

The solenoid valves V · · · comprise valve parts 18 · · · whose tip ends are fitted in the mounting block 16 and solenoid parts 19 · · · which are provided so that their tip ends are connected to the rear ends of the valve parts 18 · · ·, and fitting bores 20 · · · in which the tip ends of the valve parts 18 · · · are fitted and oil passages 21, 22 · · · which are connected to each of the valve parts 18 · · · are provided on the mounting block 16.

The solenoid parts 19 · · · are jacketed by cylindrical cases 23 · · · which are made from an electrically conductive metal, and stays 24 · · · which are made from an electrically conductive metal are fixed to the cases 23 · · ·. Bosses 25 · · · are provided on the mounting block 16 so as to project therefrom and adjoin the side of each of the solenoid valves V, V · · ·, one or two of the stays 24, 24 of the solenoid valves V, V are fastened to each of the bosses 25 · · · by means of a bolt 26, and thus each of the solenoid valves V, V · · · is secured to the mounting block 16.

As is shown in FIG. 2 to FIG. 6 together with FIG. 1, a coupler assembly 28 integrally comprising a rectangular tubular coupler 27 is placed at a position which is spaced back from each of the solenoid parts 19, 19 of the solenoid valves V, V · · · . The coupler assembly 28 comprises a first body 31 which is made from a synthetic resin and integrally comprises the coupler 27 and a second body 32 which is made from a synthetic resin and mounted on the first body 31 such that they overlap each other, and the coupler assembly 28 is detachably mounted on the mounting block 16.

A columnar protrusion 31a is integrally formed on one end of the first body 31 so as to protrude towards the side opposite the second body 32, and the coupler 27 is integrally connected to the tip end of the protrusion 31a. Furthermore, the protrusion 31a is inserted into an outlet hole 29 which is provided on the aforementioned cover 17 so as to position the coupler 27 outside the cover 17, and the outer circumference of the protrusion 31a is equipped with an annular sealing member 30 which is in elastic contact with the inner circumference of the outlet hole 29.

The coupler 27 stores and positions connection terminals 33A, 33B, 33C, 33D, 33E which individually correspond to the solenoid valves V, V · · · and a pair of connection terminals 34A, 34B which correspond to a thermistor 35 which is provided at the end of the second body 32 on the side opposite to the coupler 27. Each of the connection terminals 33A to 33E, 34A, 34B is supported on the first body 31, that is to say, the coupler assembly 28 by means of part of each of the connection terminals 33A to 33E, 34A, 34B penetrating the protrusion 31a.

Figure 7:
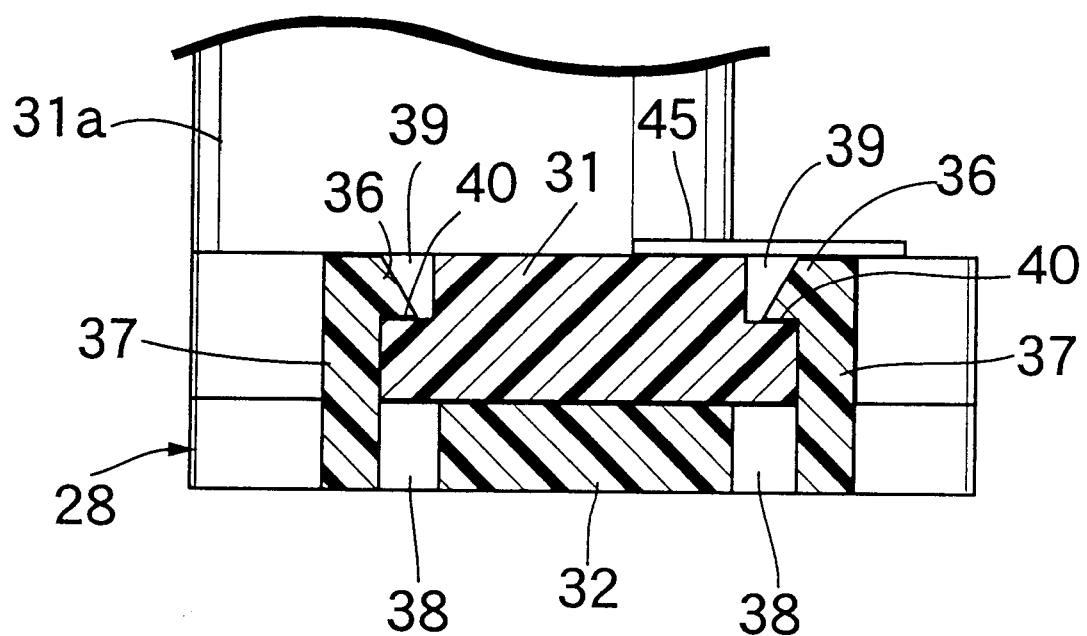

Referring to FIG. 7 together with the other figures, hooks 37 · · · which have engagement claws 36 · · · at their tip ends are integrally provided at a plurality of positions, for example, three positions on the outer circumference of the second body 32 so as to extend towards the first body 31, and opening parts 38 · · · are provided in areas of the second body 32 adjoining the inner sides of the hooks 37 · · · in order to introduce elasticity to each of the hooks 37 · · · . Notches 39 · · · for containing the hooks 37 are provided on the outer circumference of the first body 31 in areas corresponding to each of the hooks 37, and locking steps 40 · · · which face the side opposite the second body 32 are formed in the first body 31 inside the notches 39 so that they can engage with the engagement claws 36 · · · .

Figure 6:
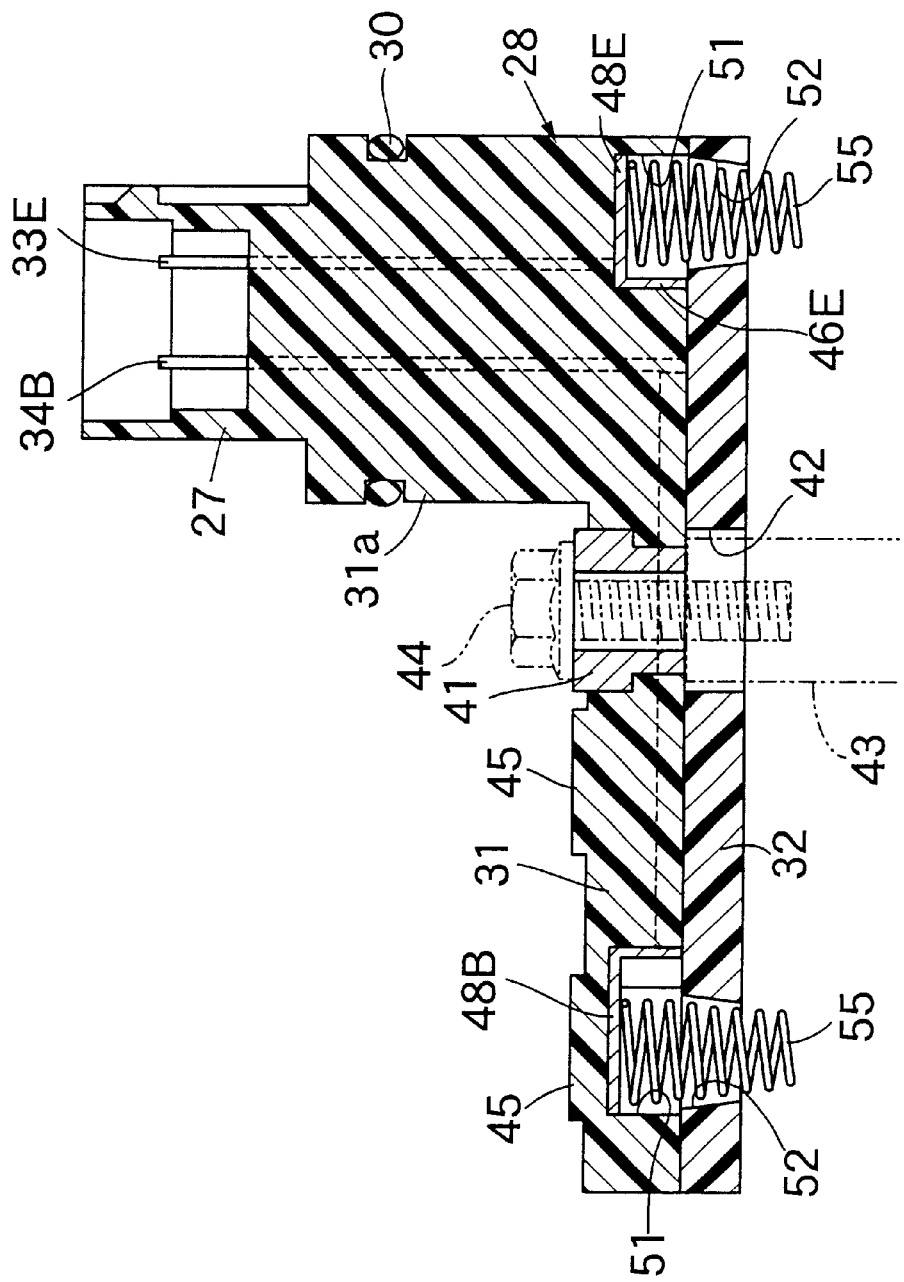

By elastically engaging the engagement claws 36 · · · of the hooks 37 · · · with the locking steps 40 · · · the second body 32 is mounted on the first body 31 in a manner such that they are superimposed on each other, but since the hooks 37 · · · are contained in the corresponding notches 39 · · · which are provided on the outer circumference of the first body 31 the size of the external shape of the coupler assembly 28 does not increase by the hooks 37 · · ·, by which the first and second bodies 31, 32 are attached to each other Referring particularly to FIG. 6, collars 41, 41 made from a metal are formed by press fitting or insertion at, for example, two positions in the first body 31, and through holes 42, 42 are provided in the second body 32 so as to correspond to the respective collars 41, 41. Bosses 43 · · · whose tip ends can make contact with the collars 41, 41 through the corresponding through holes 42, 42 · · · are integrally provided on the mounting block 16, and by tightening bolts 44 · · · which are inserted through the corresponding collars 41, 41 so as to be screwed into the corresponding bosses 43 · · · the coupler assembly 28 is detachably mounted on the mounting block 16.

The coupler 27 is placed in the coupler assembly 28 at a position corresponding to one of the five solenoid valves V, V · · · which are fixed on the mounting block 16, the collars 41,41 are placed in the coupler assembly 28 so as to avoid the positions corresponding to the remaining four solenoid valves V, V · · · and circular contacting projections 45, 45 · · · which are in contact with the inner surface of the cover 17 are integrally provided on the first body 31 at positions corresponding to the remaining four solenoid valves V, V · · · .

Figure 8:
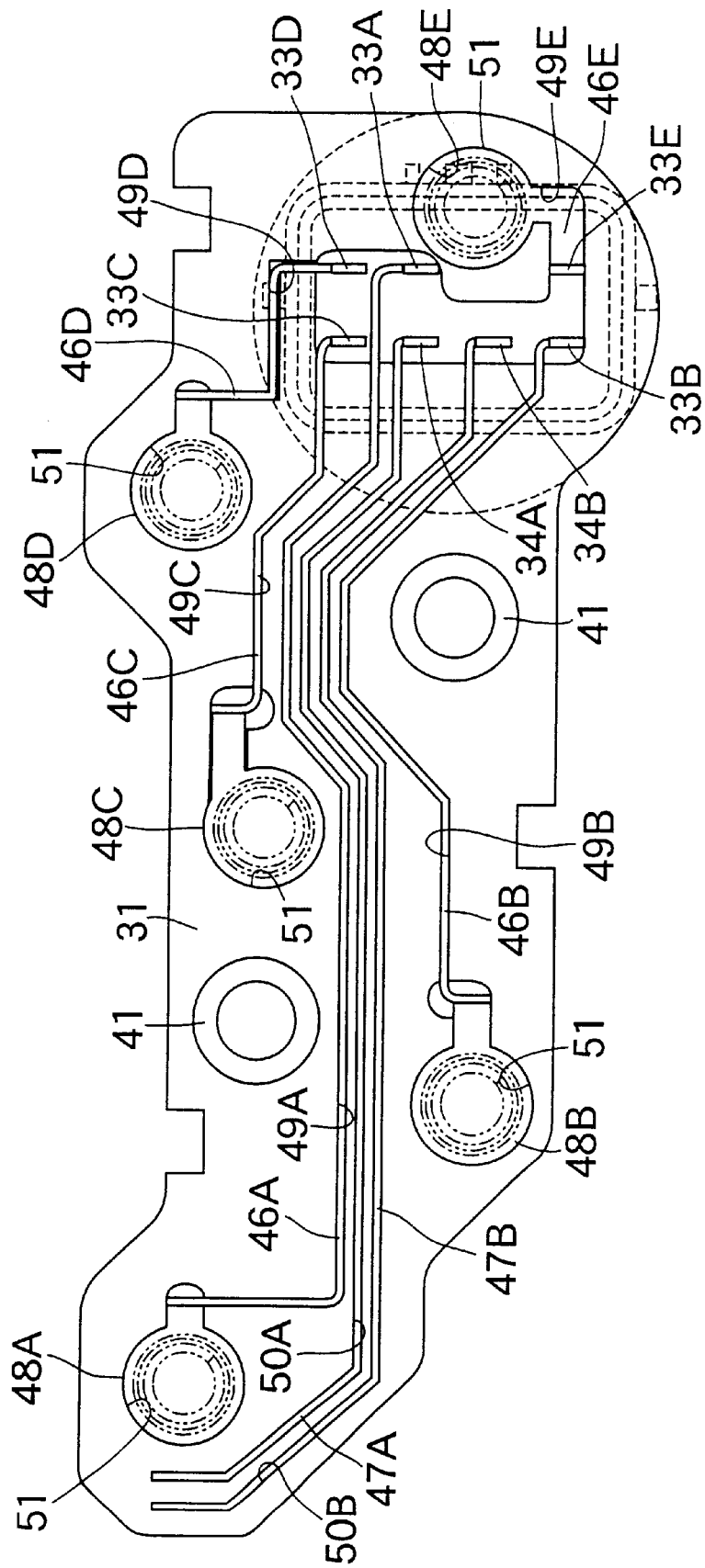

Referring at the same time to FIG. 8, a plurality of lead members 46A, 46B, 46C, 46D, 46E, 47A, 47B made from an electrically conductive metal, each of which has one end connected to the respective connection terminals 33A to 33E, 34A, 34B, are arranged in the coupler assembly 28. Each of the lead members 46A to 46E, 47A, 47B is arranged on the side of the first body 31 facing the second body 32, and because the first and second bodies 31, 32 overlap each other the lead members 46A to 46E, 47A, 47B are arranged inside the coupler assembly 28.

Circular first flat terminals 48A, 48B, 48C, 48D, 48E are fixedly placed on the side of the coupler assembly 28 facing the mounting block 16 at individual positions corresponding to the respective solenoid valves V, V · · ·, and the first flat terminals 48A to 48E are connected to the other ends of the corresponding lead members 46A to 46E.

Figure 9:
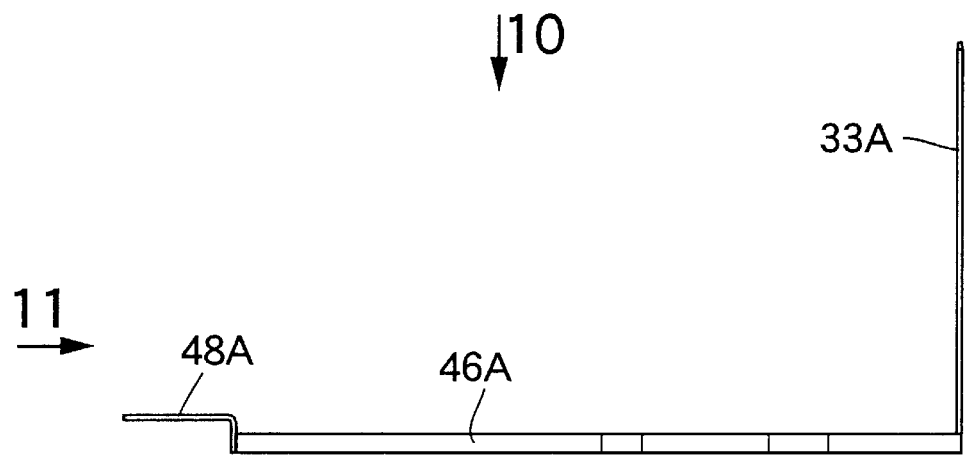
Figure 10:
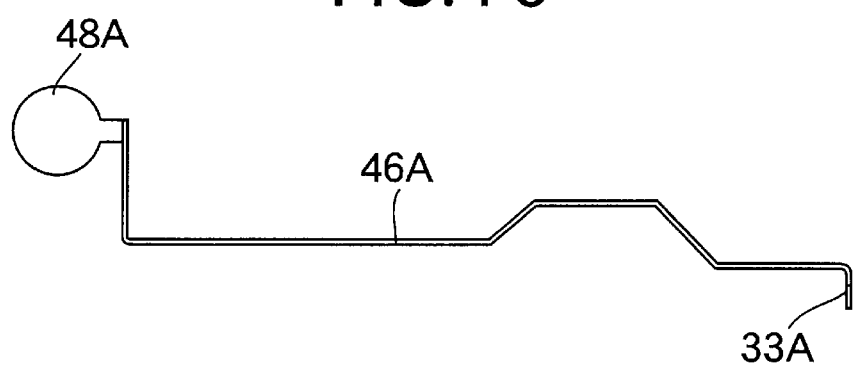
Figure 11:
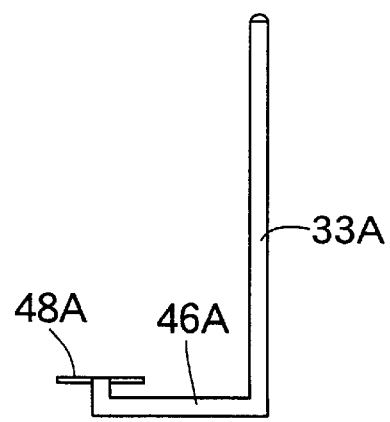

In FIG. 9 the first flat terminal 48A, the lead member 46A and the connection terminal 33A are integrally formed by bending an electrically conductive metal sheet material, and the lead member 46A is fitted in a channel 49A which is provided on the side of the first body 31 facing the second body 32.

Furthermore, the first flat terminal 48B, the lead member 46B and the connection terminal 33B, the first flat terminal 48C, the lead member 46C and the connection terminal 33C, the first flat terminal 48D, the lead member 46D and the connection terminal 33D and the first flat terminal 48E, the lead member 46E and the connection terminal 33E are also each integrally formed by bending electrically conductive metal sheet materials, and the lead members 46B to 46E are fitted in channels 49B to 49E respectively which are provided on the side of the first body 31 facing the second body 32.

The lead members 47A, 47B and the connection terminals 34A, 34B are also each integrally formed by bending electrically conductive metal sheet materials, and the lead members 47A, 47B are fitted in channels 50A, 50B respectively which are provided on the side of the first body 31 facing the second body 32.

That is to say, although each of the lead members 46A to 46E, 47A, 47B is arranged on the side of the first body 31 facing the second body 32, since the first and second bodies 31, 32 which form the coupler assembly 28 overlap each other, the lead members 46A to 46E, 47A, 47B are arranged inside the coupler assembly 28.

Circular recessed parts 51, 51 · · · which contain the corresponding first flat terminals 48A to 48E are provided on the side of the first body 31 facing the second body 32, and since the first flat terminals 48A to 48E are integral with the lead members 46A to 46E respectively the first flat members 48A to 48E are placed inside the respective recessed parts 51, 51 · · · and fixed to the side of the first body 31 facing the second body 32.

Insertion holes 52, 52 · · · which correspond to the recessed parts 51, 51 · · · respectively are provided in the second body 32, and these insertion holes 52, 52 · · · are made in the form of a tapered hole whose diameter increases as it goes towards the first body 31.

Referring to FIG. 1 in particular, the rear ends of the cases 23, 23 · · · which are parts of the solenoid parts 19, 19 · · · of the respective solenoid valves V, V · · · are covered with covering parts 53, 53 made from a synthetic resin, and second flat terminals 54, 54 · · · which are connected to one end of the coils (not illustrated) which are parts of the solenoid parts 19, 19 · · · are arranged on the covering parts 53, 53 · · · so as to be individually opposite the first flat terminals 48A to 48E.

Elastic connecting members 55, 55 · · ·, which are conical coil springs whose larger diameter ends are positioned on the side of the first body 31 so as to correspond to the tapered insertion holes 52, 52 · · · respectively, are placed between each of the first flat terminals 48A to 48E and the second flat terminals 54, 54 · · · which face each other such that parts of the elastic connecting members 55, 55 · · · are inserted inside the corresponding insertion holes 52, 52 · · · . Thus, the first flat terminals 48A to 48E and the second flat terminals 54, 54 · · · are electrically connected to each other via the elastic connecting members 55, 55 · · · .

The other ends of the coils which are parts of the solenoid parts 19, 19 · · · are electrically connected to the cases 23, 23 · · · and are earthed by being connected to a vehicle body via the stays 24, 24 · · · and the mounting block 16.

The action of the above-mentioned first embodiment is explained below. The coupler assembly 28 integrally comprising the coupler 27 is detachably mounted on the mounting block 16 in a position which is spaced back from each of the solenoid parts 19, 19 · · · of the solenoid valves V, V · · ·, the lead members 46A to 46E, each of which has one end connected to the corresponding connection terminals 33A to 33E which are positioned inside the coupler 27, are arranged on the coupler assembly 28, and elastic connecting members 55, 55 made from an electrically conductive metal are provided between each of a plurality of first flat terminals 48A to 48E, each of which is connected to the other end of the corresponding lead members 46A to 46E and fixedly positioned on the side of the coupler assembly 28 facing the mounting block 16, and second flat terminals 54, 54 · · · which are arranged at the rear end of each of the solenoid parts 19, 19 · · · so as to be individually opposite the first flat terminals 48A to 48E.

Each of the connection terminals 33A to 33E inside the coupler 27 can therefore be individually connected to the solenoid parts 19, 19 · · · of the respective solenoid valves V, V · · · simply by mounting the coupler assembly 28 on the mounting block 16 so as to provide the elastic connecting members 55, 55 · · · between the first and second flat terminals 48A to 48E; 54, 54 · · · . That is to say, there is no need to connect the lead wires during assembly, and when carrying out maintenance such as replacement of each of the solenoid valves V, V · · · the coupler assembly 28 may be demounted from the mounting block 16 and there is no need to disconnect the lead wires. It is therefore possible to enhance the operational efficiency by carrying out the connection and disconnection between each of the solenoid parts 19, 19 · · · of the solenoid valves V, V · · · and the corresponding connection terminals 33A to 33E inside the coupler 27 with great ease so simplifying the assembly and maintenance operations. Moreover, there is no possibility of erroneous connection of the lead wires and there is no need to take care over trapping of the lead wires.

The elastic connecting members 55 can absorb a displacement of the relative positions of the mounting block 16 and the coupler assembly 28 and form a reliable electrical connection between the first and second flat terminals 48A to 48E; 54, 55 · · · , it is unnecessary to enhance the assembly accuracy with which the coupler assembly 28 is mounted on the mounting block 16, and the coupler assembly 28 can be easily mounted on the mounting block 16.

Although providing, for example, a male terminal on the side of the coupler assembly 28 and, for example, a female terminal on the side of the solenoid part 19, and connecting these terminals by interlocking them with each other can be considered, the above-mentioned arrangement in which the elastic connecting members 55, 55 · · · are provided between the first flat terminals 48A to 48E and the second flat terminals 54, 54 · · · has the following advantages in comparison with the interlocking connection.

That is to say, it is unnecessary to determine the relative positioning of the terminals which correspond to each other with high accuracy. Furthermore, it is unnecessary to consider deformation of the male terminal during the interlocking connection, and there is no need to consider deformation of the male terminal due to a load imposed by the female terminal when the interlocking connection is released. Moreover, it is unnecessary to provide a guide for carrying out highly accurate positioning during the interlocking connection.

The coupler assembly 28 is formed from a first body 31 made from a synthetic resin integrally comprising the coupler 27 and a second body 32 made from a synthetic resin which is mounted on the first body 31 so that they overlap each other, a plurality of lead members 46A to 46E which have one end connected to a plurality of connection terminals 33A to 33E respectively which are fixedly positioned inside the coupler 27 and a plurality of first flat terminals 48A to 48E, each of which is connected to the other end of the lead members 46A to 46E respectively, are arranged on the side of the first body 31 facing the second body 32, and insertion holes 52, 52 · · · , into each of which a part of the corresponding elastic connecting members 55, 55 · · · is inserted, are provided on the second body 32 so as to correspond to the first flat terminals 48A to 48E respectively.

That is to say, the lead members 46A to 46E are interposed between the first and second bodies 31, 32, it is thus possible to protect the lead members 46A to 46E while rendering them electrically insulating, and by inserting part of the elastic connecting members 55, 55 · · · into the insertion holes 52, 52 · · · one end of the elastic connecting members 55, 55 · · · can easily be guided to the first flat terminals 48A to 48E.

Since each of the insertion holes 52, 52 · · · is made in the form of a tapered hole whose diameter increases as it goes towards the first body 31 and each of the elastic connecting members 55, 55 · · · is a conical coil spring whose larger diameter end is positioned on the side of the first body 31, it is possible to prevent the elastic connecting members 55, 55 · · · from dropping from the insertion holes 52, 52 · · · . Therefore, no special arrangement to retain the elastic connecting members 55, 55 · · · in the coupler assembly 28 is necessary, and moreover the accuracy of positioning the elastic connecting members 55, 55 · · · inside the insertion holes 52, 52 · · · can be enhanced.

Furthermore, since a plurality of hooks 37, 37 · · · are integrally provided on one of the first and second bodies 31, 32 (the second body 32 in the present embodiment), which are elastically engaged with the other of the first and second bodies 31, 32 (the first body 31 in the present embodiment), no special member such as a screw part for mounting the second body 32 on the first body 31 is necessary, and the second body 32 can easily be mounted on the first body 31 by means of a small number of parts.

Figure 12:
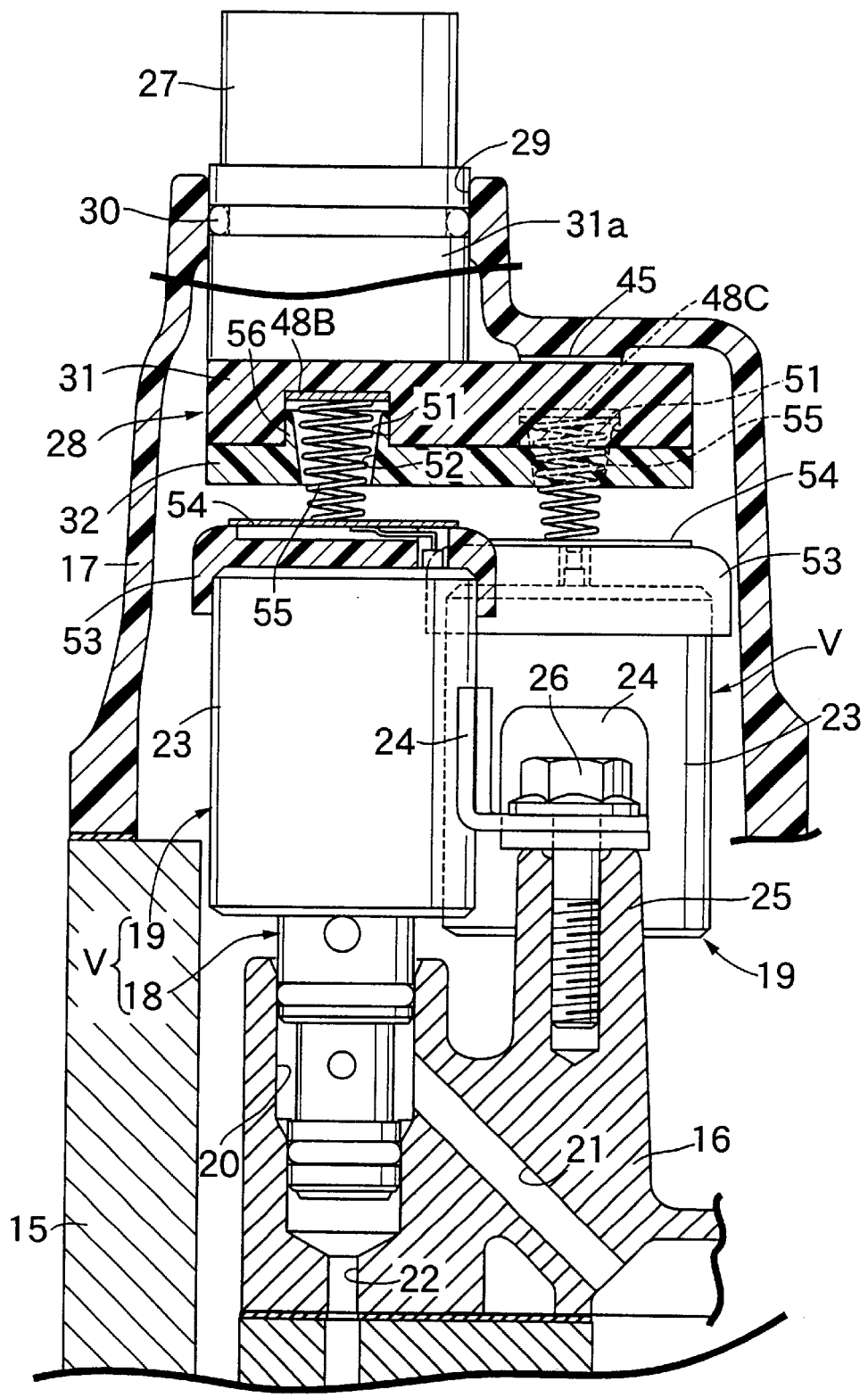
FIG. 12 is a vertical cross-sectional front view of a solenoid valve device corresponding to FIG. 1, but according to a second embodiment of the present invention.

The second embodiment of the present invention is explained by reference to FIG. 12. A plurality of fitting projections 56 · · · which are made in the form of a tube so as to form parts of the insertion holes 52 · · · are projectingly provided on the second body 32 so as to fit in the recessed parts 51 · · · provided on the first body 31 while containing the first flat terminals 48A to 48E.

In accordance with the second embodiment, the relative position of the first and second bodies 31, 32 can reliably and easily be adjusted and the accuracy with which the elastic connecting members 55 · · · are guided by the insertion holes 52 · · · can be enhanced as a result of an increase in the length of the insertion holes 52 · · · by a length corresponding to that of the fitting projections 56 · · · .

The embodiments of the present invention are explained in detail above, but the present invention is not limited by the above-mentioned embodiments and can be modified in a variety of ways without departing from the present invention described in the Claims.

For example, in the above-mentioned embodiments the lead members 46A to 46E made from an electrically conductive metal sheet material are fitted on the side of the first body 31 facing the second body 32, but each of the lead members may comprise a printed circuit formed on the side of the first body 31 facing the second body 32.

What is claimed is:

1. A solenoid valve device in which a plurality of solenoid valves each comprising a valve part whose tip end is fitted in a fixed mounting block and a solenoid part whose tip end is provided continuously at a rear end of said valve part are fixed to said mounting block, and connection terminals, each of which is connected to the solenoid part of the respective solenoid valves, are placed inside a common coupler, wherein a coupler assembly integrally provided with said coupler is detachably mounted on said mounting block at a position which is spaced back from each of said solenoid parts, a plurality of electrically conductive lead members, each of which has one end connected to said connection terminals respectively, are arranged in said coupler assembly, and elastic connecting members made from an electrically conductive metal are respectively interposed between a plurality of first flat terminals, each of which is connected to the other end of the corresponding lead member and fixedly positioned on the side of said coupler assembly facing the mounting block, and second flat terminals which are arranged at the rear ends of said respective solenoid parts so as to be individually opposite the first flat terminals.

2. A solenoid valve device according to claim 1, wherein said coupler assembly is comprised of a first body made from a synthetic resin integrally provided with said coupler and a second body made from a synthetic resin which is mounted on the first body such that they overlap each other, wherein said lead members which each have one end connected to a plurality of said connection terminals respectively which are fixedly positioned inside said coupler, and said first flat terminals, each of which is connected to the other end of said lead members respectively, are arranged on the side of the first body facing the second body, and wherein insertion holes, into each of which a part of each of said elastic connecting members is inserted, are provided on the second body so as to correspond to said first flat terminals respectively.

3. A solenoid valve device according to claim 2, wherein a plurality of recessed parts which housing the first flat terminals respectively are provided on the side of the first body facing the second body, and a plurality of fitting projections, each of which is made in the form of a tube so as to form a part of each of said insertion holes, are projectingly provided on the second body so as to be capable of fitting in each of said recessed parts.

4. A solenoid valve device according to claim 2 or claim 3, wherein each of said insertion holes is made in the form of a tapered hole whose diameter increases as it goes towards the first body and each of said elastic connecting members is a conical coil spring whose larger diameter end is positioned on the side of the first body.

5. A solenoid valve device according to claim 2 or claim 3, wherein a plurality of hooks which elastically engage with one of the first and second bodies are integrally provided on the other of the first and second bodies.

* * * * *